US011009955B2

United States Patent
Bloom et al.

(10) Patent No.: US 11,009,955 B2
(45) Date of Patent: May 18, 2021

(54) STYLUS WITH SHEAR FORCE FEEDBACK

(71) Applicant: Apple Inc., Cupertino, CA (US)

(72) Inventors: David H. Bloom, San Francisco, CA (US); Benjamin G. Jackson, Belmont, CA (US); Steven J. Taylor, San Jose, CA (US)

(73) Assignee: Apple Inc., Cupertino, CA (US)

(*) Notice: Subject to any disclaimer, the term of this patent is extended or adjusted under 35 U.S.C. 154(b) by 37 days.

(21) Appl. No.: 16/183,610

(22) Filed: Nov. 7, 2018

(65) Prior Publication Data
US 2020/0033947 A1 Jan. 30, 2020

Related U.S. Application Data

(60) Provisional application No. 62/712,100, filed on Jul. 30, 2018.

(51) Int. Cl.
G06F 3/01 (2006.01)
G06F 3/0354 (2013.01)

(52) U.S. Cl.
CPC .......... *G06F 3/016* (2013.01); *G06F 3/03545* (2013.01)

(58) Field of Classification Search
CPC ................. G06F 3/03545; G06F 3/016; G06F 3/041661; G06F 3/03547
See application file for complete search history.

(56) References Cited

U.S. PATENT DOCUMENTS

| | | | | |
|---|---|---|---|---|
| 2012/0140428 A1* | 6/2012 | Hsu | ........................ | G06F 1/1613 361/807 |
| 2014/0285475 A1* | 9/2014 | Ogata | ................. | G06F 3/03545 345/175 |
| 2017/0344134 A1* | 11/2017 | Mishalov | .................. | G01L 1/18 |
| 2018/0024650 A1* | 1/2018 | Hou | ..................... | G06F 3/03545 345/179 |
| 2018/0217687 A1* | 8/2018 | Yoo | ........................... | G06F 1/16 |
| 2019/0064943 A1* | 2/2019 | Chang | .................. | B43K 21/006 |
| 2019/0384424 A1* | 12/2019 | Bell | ..................... | G06F 3/03545 |

* cited by examiner

*Primary Examiner* — Abbas I Abdulselam
(74) *Attorney, Agent, or Firm* — Morgan, Lewis & Bockius LLP

(57) ABSTRACT

Touch-based input devices, such as a stylus, can provide feedback in the form of shear forces applied to the user. A stylus can produce shear forces that act on a user to provide unique tactile sensations. For example, a shear device can be included at a grip region of a stylus to provide shear sensations at the user's hands (e.g., fingers). The shear forces can be unaligned forces that urge one part of the user's hand in one direction and another part of the user's hand in an opposite direction or that tend to maintain the other part of the user's hand in a stationary location.

19 Claims, 6 Drawing Sheets

STYLUS WITH SHEAR FORCE FEEDBACK

CROSS-REFERENCE TO RELATED APPLICATIONS

This application claims the benefit of U.S. Provisional Application No. 62/712,100, entitled "STYLUS WITH SHEAR FORCE FEEDBACK," filed Jul. 30, 2018, the entirety of which is incorporated herein by reference.

TECHNICAL FIELD

The present description relates generally to hand-held devices, and, more particularly, to styluses.

BACKGROUND

A variety of handheld devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
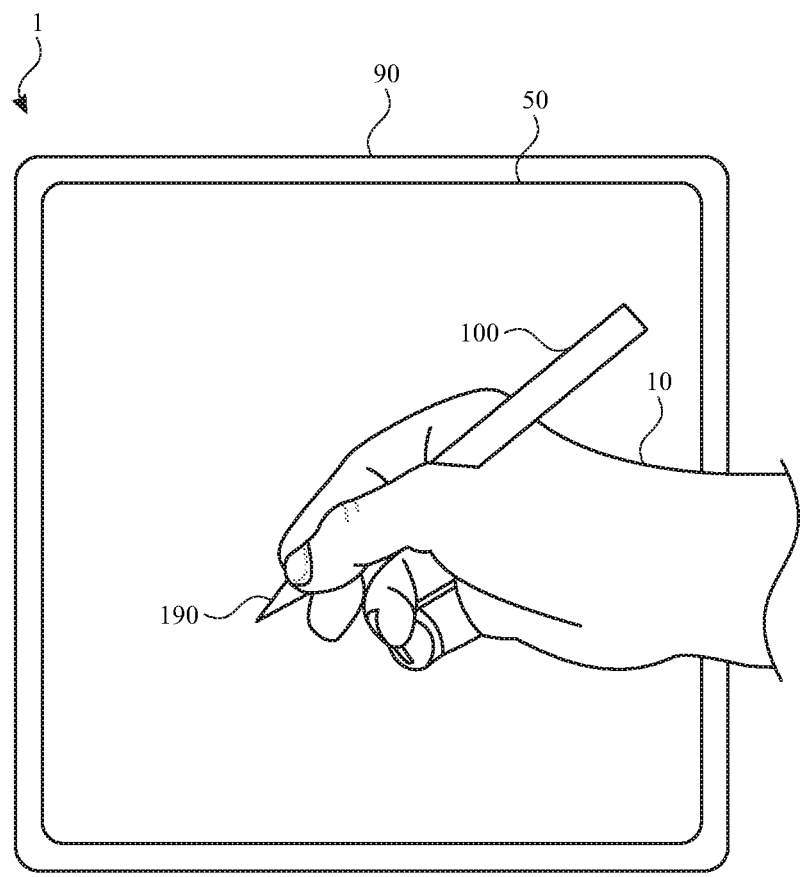
FIG. 1 illustrates a view of a system including a stylus and an external device, according to some embodiments of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user and also provide haptic feedback to a user. For example, one or more vibration devices located under a touch panel of an electronic device can provide haptic feedback to a user by way of vibrations when the user is touching the touch screen. Such vibrations can be utilized to convey a variety of different information to a user, such as information regarding one or more touch inputs that a user has provided, alerts, or status of the electronic device or one or more applications executing thereupon.

Haptic feedback provided via devices with a display surface and/or a touch panel may not convey information adequately to a user when a stylus or other touch-based input device is utilized. In such a case, the user may not be directly touching the surface of the device that provides haptic feedback. As such, the user may not perceive the haptic feedback provided on the surface. Additionally, some existing styluses may provide haptic feedback generally across an entirety of the device (e.g., stylus). Such configurations may be limited in the type of sensation provided to the user and may require greater power consumption than more targeted types of feedback.

In accordance with embodiments disclosed herein, improved styluses can produce shear forces that act on a user to provide unique tactile sensations. For example, a shear device can be included at a grip region of a stylus to provide shear sensations at the user's hand (e.g., fingers). The shear forces can be unaligned forces that urge one part of the user's hand in one direction and another part of the user's hand in an opposite direction or that tend to maintain the other part of the user's hand in a stationary location. The sensation can be targeted directly to the user's hand, rather than generally across the entire stylus. Shear forces can be used with a virtual reality, augmented reality, or mixed reality system to simulate tactile sensations of interacting with physical objects even when no such objects are present.

These and other embodiments are discussed below with reference to FIGS. 1-11. However, those skilled in the art will readily appreciate that the detailed description given herein with respect to these Figures is for explanatory purposes only and should not be construed as limiting.

A touch-based input device in accordance with embodiments disclosed herein can include any device that is held, worn, or contacted by a user for providing input and/or receiving feedback. The touch-based input device can be used alone or in conjunction with another device. For example, FIG. 1 illustrates a system 1 including a stylus 100 and an external device 90 having a surface 50, according to some embodiments of the subject technology. The stylus 100 can be held by a user 10 and operate as a touch-based input device for use with the external device 90.

The surface 50 of the external device 90 can include a display surface and/or a touch panel for interacting with the stylus 100 when contacted thereby. The external device 90 utilizes the display to render images to convey information to the user. The display can be configured to show text, colors, line drawings, photographs, animations, video, and the like. The surface 50 of the external device 90 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

The stylus 100 can include a tip 190 for contacting the surface 50. Such contact can be detected by the external device 90 and/or the stylus 100. For example, the stylus 100 can include one or more sensors that detect when the tip 190 contacts and applies pressure to the surface 50. Such sensors can include one or more contact sensors, capacitive sensors, touch sensors, cameras, piezoelectric sensors, pressure sensors, proximity sensors, electric field sensors, photodiodes, and/or other sensors operable to detect contact with the surface 50. Such sensors can optionally operate cooperatively with the external device 90 to detect contact with the surface 50.

Figure 2:
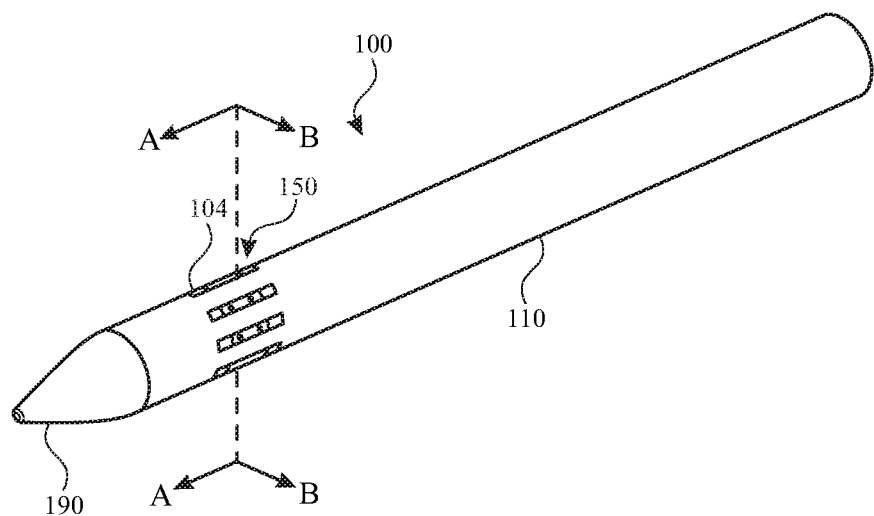
FIG. 2 illustrates a perspective view of the stylus of FIG. 1, according to some embodiments of the subject technology.

The stylus 100 can support handling and operation by a user. In particular, the stylus 100 can receive inputs from a user at a location of the user's grip. FIG. 2 illustrates a stylus 100, according to some embodiments of the subject technology. According to some embodiments, for example as illustrated in FIG. 2, the stylus 100 can include a housing 110 that provides an outermost cover along at least a portion of the length of the stylus 100. A user can grip the stylus 100 at a user grip region 104 during use of the stylus 100. The user grip region 104 can be located at a natural grip location, so that the user can receive tactile (e.g., shear) feedback at the same location that is grasped during normal use of the stylus 100. For example, the user grip region 104 can be located an outer surface of the housing 110. The user grip region 104 can be near the tip 190 of the stylus 100. For example, the location of the user grip region 104 can be a distance from the tip 190 that is less than a half, a third, or a quarter of the total length of the stylus 100. At the user grip region 104, components of the stylus 100 can be positioned to provide tactile (e.g., shear-based) feedback to the user. For example, the user grip region 104 can include a portion of the housing 110. As shown in FIG. 2, the stylus 100 can include a shear device 150 located at or defining at least a part of the user grip region 104. The shear device 150 can include components that extend along a length of the stylus 100 within the user grip region 104.

As used herein, shear forces include unaligned forces that urge one part of the user's hand (e.g., finger) in one direction and another part of the user's hand in an opposite direction. Shear forces also include forces that urge one part of the user's hand (e.g., finger) in one direction while another part of the user's hand is maintained in a stationary location. As such, shear forces can involve relative movement, even if one of the components is stationary. Shear forces can be lateral, such as forces across or parallel to a surface receiving the force, rather than forces perpendicular to the surface. It will be recognized that only a component of a force may be across or parallel to a given surface, while a given force may have contributing components in other directions.

Figure 3:
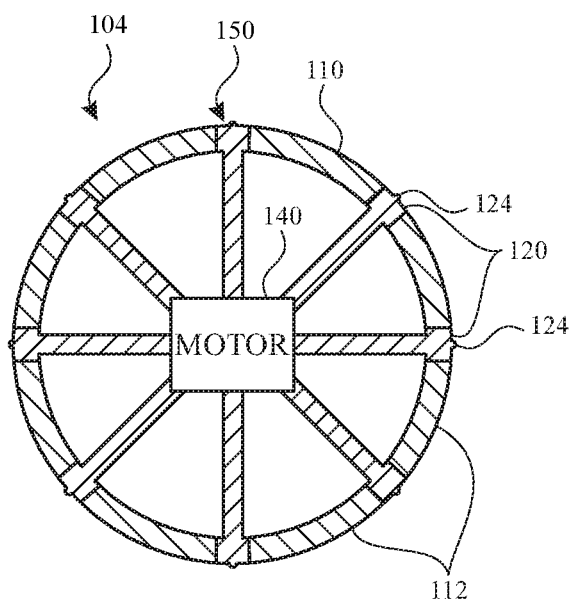
FIG. 3 illustrates a front sectional view of the section A-A of the stylus of FIG. 2, according to some embodiments of the subject technology.
Figure 4:
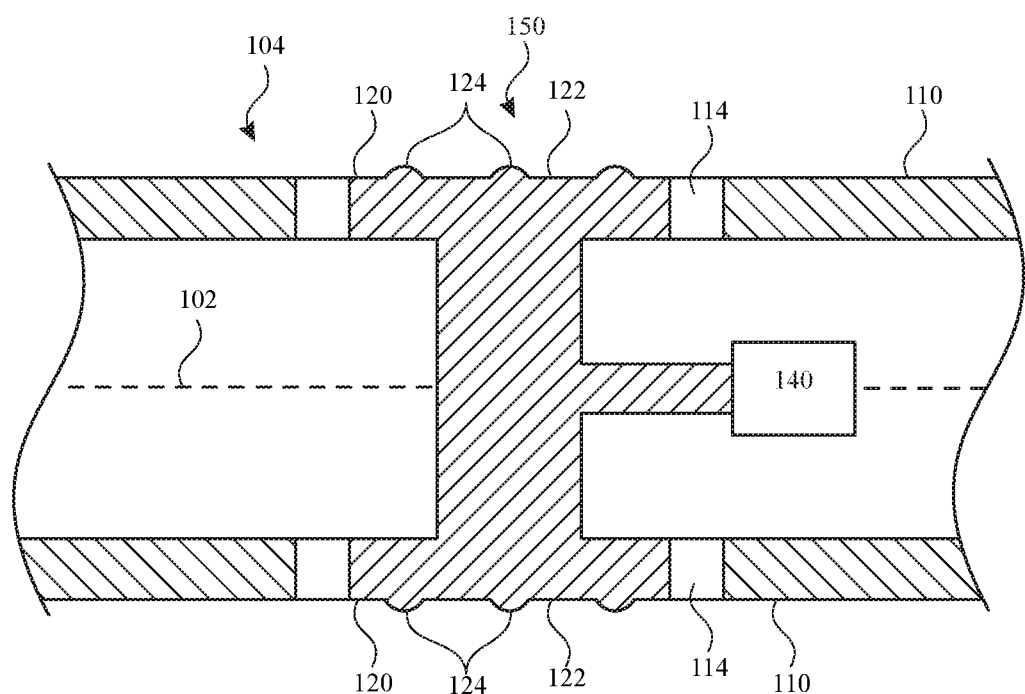
FIG. 4 illustrates a side sectional view of the section B-B of the stylus of FIG. 2, according to some embodiments of the subject technology.

Referring now to FIGS. 3 and 4, the shear device 150 can include parts that move relative to each other to provide shear forces to a user gripping the stylus 100.

The housing 110 can include multiple bridge segments 112 that are distributed about a longitudinal axis of the stylus 100. Between circumferentially adjacent pairs of bridge segments 112, one or more sliding elements 120 can be provided. As used herein, reference to "circumference" or "circumferentially" relates to a periphery of a cross-section of an object, whether the cross-section forms a circle or another shape. The bridge segments 112 and the sliding elements 120 can, together, define an outer periphery of the user grip region 104 of the stylus 100. As such, the bridge segments 112 and the sliding elements 120 can both present outwardly facing surfaces that can be grasped by a user.

As shown in FIG. 3, the bridge segments 112 and the sliding elements 120 can be arranged in an alternating pattern about the perimeter (e.g., circumference) of the user grip region 104. Each bridge segment 112 can be surrounded on sides thereof by a pair of sliding elements 120. Each sliding element 120 can be surrounded on sides thereof by a pair of bridge segments 112. Additionally or alternatively, multiple sliding elements 120 can be circumferentially adjacent to each other. Circumferentially adjacent sliding elements 120 can be configured to move in the same direction or different (e.g., opposite) directions, as discussed further herein.

The sliding elements 120 and the bridge segments 112 can define an outwardly facing external surface of the user grip region 104 of the stylus 100. As shown in FIG. 3, an outer periphery of the user grip region 104 is defined by both the bridge segments 112 and the sliding elements 120. The total area of the user grip region 104 can be divided between the bridge segments 112 and the sliding elements 120. For example, the sliding elements 120 can define 10%, 20%, 30%, 40%, 50%, 60%, 70%, 80%, or 90% of the total area of the user grip region 104. By further example, the bridge segments 112 can define 10%, 20%, 30%, 40%, 50%, 60%, 70%, 80%, or 90% of the total area of the user grip region 104. The contribution of each can be determined by the size, distribution, and number of sliding elements 120 and bridge segments 112. For example, the sliding elements 120 and bridge segments 112 can be present in the same or different numbers. The sliding elements 120 and bridge segments 112 can have the same or different sizes in one or more dimensions (e.g., length, width, arc length, etc.). While one example of a user grip region 104 is shown in FIGS. 3 and 4, it will be appreciated that variations can be provided. For example, any number of bridge segments 112 and sliding elements 120 can be provided. For example, the user grip region 104 can include 1, 2, 3, 4, 5, 6, 7, 8, 9, 10, 11, 12, or more than 12 bridge segments 112 and/or sliding elements 120.

As shown in FIG. 4, each of the sliding elements 120 can be positioned within an opening 114 of the housing 110. Each of the openings 114 can provide a space within which the corresponding sliding element 120 can move. For example, the openings 114 can be larger in at least one dimension (e.g., parallel to the longitudinal axis 102) than the corresponding sliding element 120. This allows a space in which the sliding element 120 can move, for example in a direction parallel to the longitudinal axis 102. It will be understood that the sliding elements 120 can move in any direction permitted by the corresponding opening 114.

Movement of the sliding elements 120 can be facilitated by an actuator 140, such as a motor. The actuator 140 can be configured to provide movement of the sliding elements 120 within corresponding openings 114. The actuator 140 can be connected to one, some, and/or all of the sliding elements 120. Accordingly, the actuator 140 can move the sliding elements 120 separately or in unison. Additional actuators 140 can be provided to independently move the sliding elements 120. Additionally or alternatively, the sliding elements 120 can be connected to any given actuator 140 in a manner that allows the sliding elements 120 to move differently from each other. For example, at least some of the sliding elements 120 can be connected to one or more actuators 140 by drivetrain components, such as gears, clutches, and/or transmissions, to facilitate independent or simultaneous movement of the sliding elements 120 based on operation of the one or more actuators 140. Accordingly, the sliding elements 120 can be moved in a direction together relative to bridge segments 112 so that outer surfaces of the sliding elements 120 slide laterally past outer surfaces of the bridge segments 112. Additionally or alternatively, the sliding elements 120 can be moved in different directions relative to each other so that outer surfaces of the sliding elements 120 slide laterally past each other.

One or more of the sliding elements 120 can include a base portion 122 and a protruding portion 124. The base portion 122 can be flush with a circumferentially and/or longitudinally (e.g., axially) adjacent portion of a bridge segment 112 or another portion of the housing 110. When contacted by a user, the user may not tactilely sense a difference between the base portion 122 and the adjacent bridge segment 112 while the sliding element 120 is at rest. The protruding portions 124 of the sliding elements 120 can be proud of the base portion 122, an adjacent bridge segment 112, and/or another portion of the housing 110. The protruding portions 124 provide features for engaging the user and providing tactile feedback upon movement of the sliding elements 120. The protruding portions 124 can be provided in any number or arrangement. For example, the protruding portions 124 can be distributed longitudinally along the sliding elements 120, for example in a row. Multiple protruding portions 124 can be distributed in different rows along the corresponding sliding element 120. The protruding portions 124 can be evenly or unevenly distributed. Different sliding elements 120 can have the same or different pattern of protruding portions 124. The protruding portions 124 can have the same or different sizes (e.g., width, height) and/or shapes. Additionally or alternatively, it will be understood that protruding portions can be provided on the bridge segments 112 of the stylus 100.

Engagement features of the user grip region 104 provide an increased coefficient of friction (e.g., relative to a flat or smooth surface). For example, the sliding elements 120 and/or the bridge segments 112 can engage the user's fingers while moving so that shear forces are transmitted to the user rather than sliding under and past the user's fingers.

In user, the user grasps the user grip region 104 of the stylus 100. Portions of a given finger will contact at least one bridge segment 112 and at least one sliding element 120, based on the size, distribution, and number of bridge segments 112 and sliding elements 120. As the bridge segments 112 and/or sliding elements 120 move in different directions relative to each other, shear forces are transmitted to the user. Specifically, different portions of the user grip region 104 (e.g., bridge segments 112 and sliding elements 120) engage different portions of a given finger and apply forces in different (e.g., opposite) directions. The sensation experienced by the user is that of shear forces applied to the finger(s).

As shown in FIG. 3, the bridge segments 112 in the sliding elements 120 can be evenly distributed about a perimeter of the user grip region 104. For example, the user grip region 104 can present radial and/or bilateral symmetry.

It will be appreciated that various alterations can be made to the above-described design while maintaining the operation and/or user experience. For example, the housing 110 of the stylus 100 can have one of a variety of cross-sectional shapes and sizes. Where the housing 110 in FIG. 3 has a round outer and inner cross-sectional shape to provide a generally cylindrical shape, it will be understood that the housing 110 of the stylus 100 can have one or more of a variety of shapes, such as a non-circular cross-sectional shape and/or a cross-sectional shape including a curved portion and a flat portion. Such a flat portion can be used to stabilize the stylus 100 against another surface, such as a working surface, an electronic device, and/or a charging station.

Figure 5:
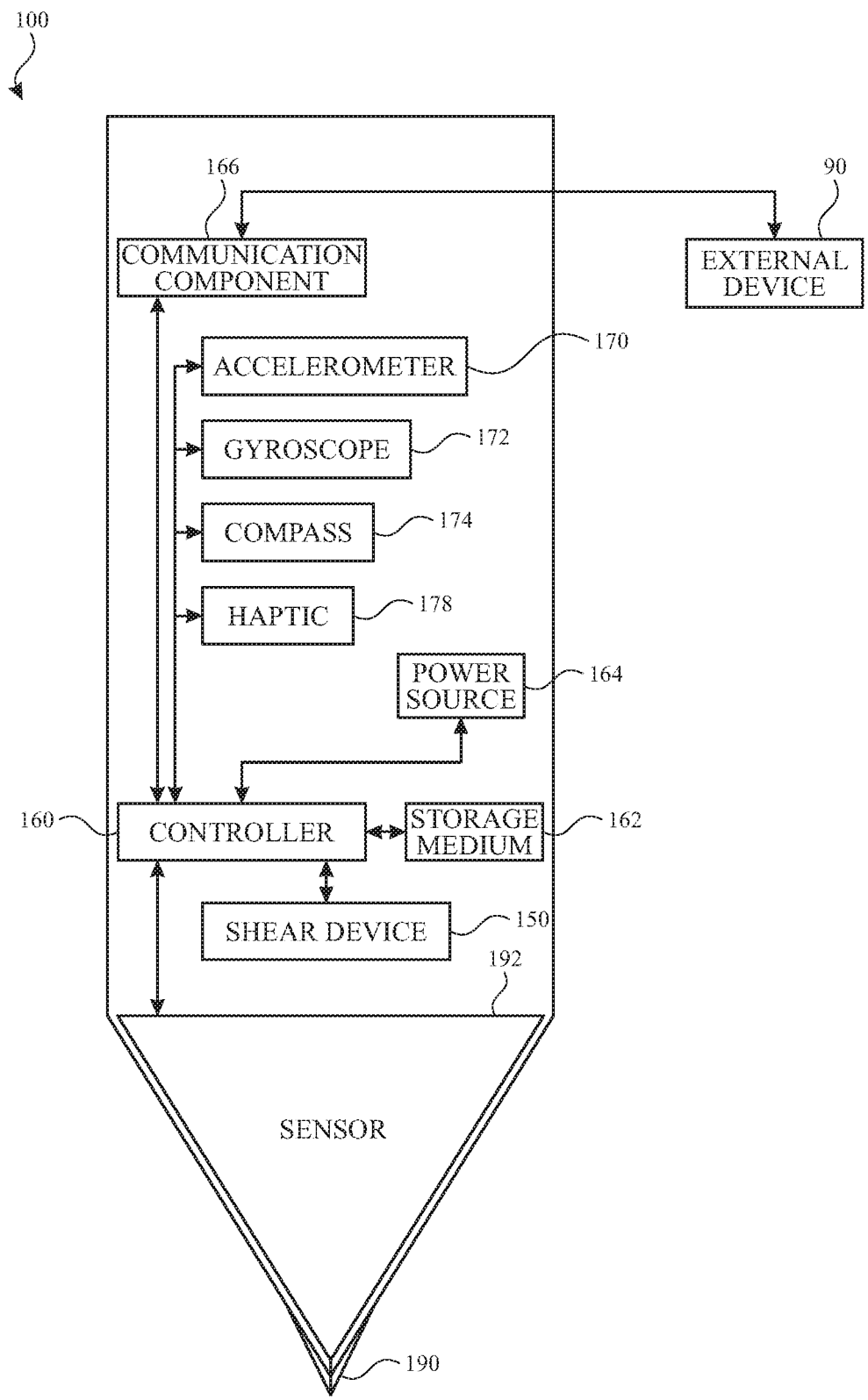
FIG. 5 illustrates a block diagram illustrating the stylus and the external device of FIG. 1, according to some embodiments of the subject technology.

As shown in FIG. 5, the stylus 100 can include components that support handling and operation by a user. Inputs can be provided by a user at one or more components of the stylus 100, and feedback, including shear forces, can be provided to the user.

A force sensor 192 can be operated to detect user inputs at the tip 190 of the stylus 100. The force sensor 192 can interact with both the tip 190 and the housing 110 to detect relative motion of the tip 190 and the housing 110. For example, the force sensor 192 can be operated to detect when the tip 190 is contacting a surface, such as the surface of the external device 90. The detection can be based on movement of the tip 190 relative to the housing 110. Accordingly, the force sensor 192 can be directly or indirectly connected to both the tip 190 and the housing 110 to detect relative motion there between. The force sensor 192 can include a component that converts mechanical motion of the tip 190 into an electric signal. The force sensor 192 can include one or more contact sensors, capacitive sensors, touch sensors, strain gauges, cameras, piezoelectric sensors, pressure sensors, photodiodes, and/or other sensors. The force sensor 192 can detect both the presence and magnitude of a force.

In use, a user may manipulate the stylus 100 and apply a force to a surface of the external device 90. A corresponding reaction force may be transferred through the tip 190 of the stylus 100 connected to an electromechanical coupling and to the force sensor 192 of the stylus 100. The force sensor 192, or a portion thereof, may deform in response which may be measured and used to estimate the applied force. The force sensor 192 can be used to produce a non-binary output that corresponds to the applied force. For example, the force sensor 192 can be used to produce an output that represents a magnitude that varies in accordance with a variable amount of applied force.

As further shown in FIG. 5, the stylus 100 can include an accelerometer 170, a gyroscope 172, and/or a compass 174. During use, the accelerometer 170 can track and record acceleration of the stylus 100. Acceleration can be measured in a three-dimensional (x, y, and z) coordinate system. For example, the accelerometer 170 can have at least three components that each measure acceleration in one of three mutually orthogonal axes. By combining the measurements of all components, acceleration in the three-dimensional coordinate system can be determined. The accelerometer 170 can be configured to measure and record acceleration at several points in time during a sampling period. For example, the measurements can be taken at regular intervals of time. Other components of the stylus 100, such as the gyroscope 172 and/or the compass 174, can be used to measure orientation of the stylus 100. The movement (e.g., translational movement and/or rotational movement) of the stylus (e.g., tip 190) can be calculated based, at least in part, on the measurements of the accelerometer 170, the gyroscope 172, and/or the compass 174. The stylus 100 can also include other components, such as a GPS receiver, that can be used to measure or calculate the position, velocity, and/or acceleration of the stylus 100.

Additionally or alternatively, the stylus 100 can provide position and orientation detection while operating in concert with another device, such as external device 90. For example, the stylus 100 can be observed by a measurement component of the external device 90. For example, the measurement component can optically or otherwise observe the stylus 100 to determine its position and/or orientation in space relative to the external device 90. The stylus 100 can include one or more features that allow the external device 90 to interpret the position, distance, orientation, and/or movement of the stylus 100.

As further shown in FIG. 5, the stylus 100 can include a haptic device 178 for providing haptic feedback to a user. The haptic device 178 can be separate from the shear device 150 described herein. The haptic device 178 can provide haptic feedback with tactile sensations to the user. The haptic device 178 can be implemented as any suitable device configured to provide force feedback, vibratory feedback, tactile sensations, and the like. For example, in one embodiment, the haptic device 178 may be implemented as a linear actuator configured to provide a punctuated haptic feedback, such as a tap or a knock. The haptic device 178 can be provided in concert with shear forces provided by the shear device 150.

As further shown in FIG. 5, the stylus 100 can include a controller 160 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 160 can execute one or more instructions stored in the non-transitory storage medium 162 to perform one or more functions.

As further shown in FIG. 5, the stylus 100 can include a power source 164, such as one or more batteries and/or power management units. The stylus 100 can include components for charging the power source 164. Alternatively or in combination, the stylus 100 can include wireless charging capabilities for charging the power source 164. According to some embodiments, the stylus 100 can include components for converting mechanical energy into electrical energy. For example, the stylus 100 can include a piezoelectric device and/or a coil and magnetic components for generating electrical power upon mechanical movement thereof.

As further shown in FIG. 5, the stylus 100 can include a communication component 166 for communicating with the external device 90 and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90 and/or another device.

The stylus 100 can include other components including, but not limited to, displays, sensors, switches (e.g., dome switches), buttons, voice coils, and/or other components. The stylus 100 can detect environmental conditions and/or other aspects of the operating environment of the stylus 100 with an environmental sensor such as an ambient light sensor, proximity sensor, temperature sensor, barometric pressure sensor, moisture sensor, and the like. The stylus 100 can detect biological characteristics of the user manipulating the stylus with a biosensor that detects skin temperature, heart rate, respiration rate, blood oxygenation level, blood volume estimates, blood pressure, or a combination thereof. The stylus 100 can quantify or estimate a property of an object nearby or otherwise external to the stylus 100 with a utility sensor such as magnetic field sensors, electric field sensors, color meters, acoustic impedance sensors, pH level sensor, material detection sensor, and so on. Such data may be used to adjust or update the operation of the stylus 100 and/or may communicate such data to the external device 90 to adjust or update the operation thereof.

The external device 90 can also include components that facilitate operation of the stylus 100. For example, the external device 90 can include one or more of a processor, a memory, a power supply, one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on. In some embodiments, a communication interface of the external device 90 facilitates electronic communications between the external device 90 and the stylus 100.

Figure 6:
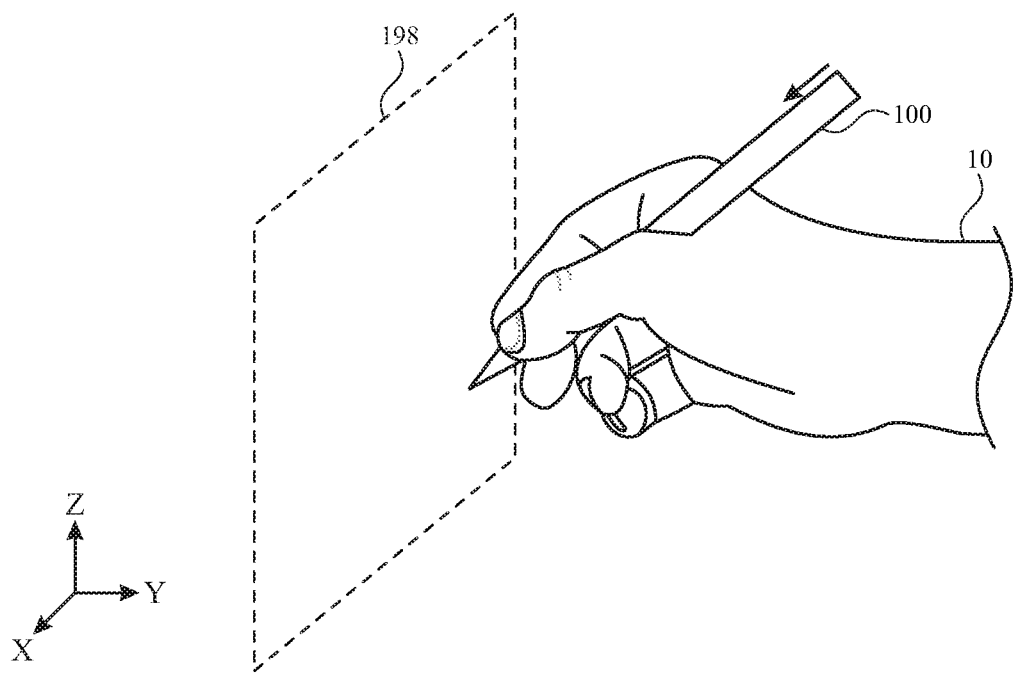
FIG. 6 illustrates a perspective view of a stylus for providing shear force feedback to a user during use, according to some embodiments of the subject technology.
Figure 7:
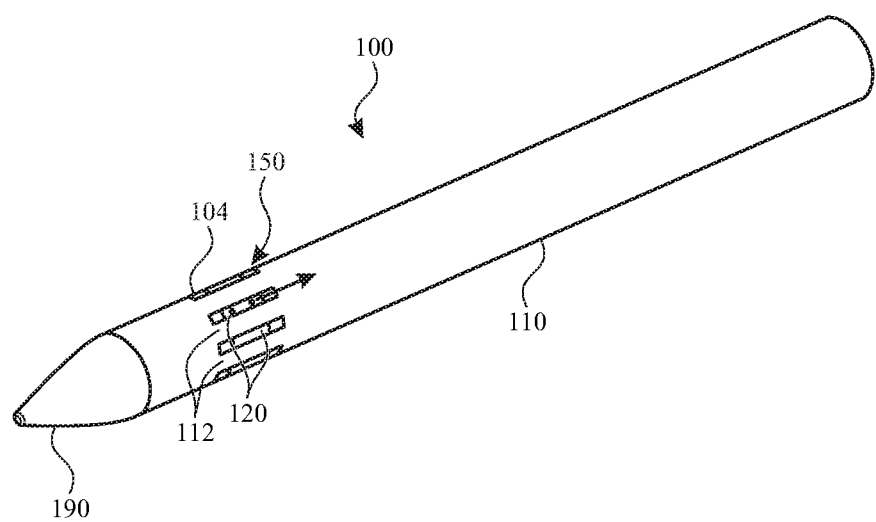
FIG. 7 illustrates a perspective view of the stylus of FIG. 6, according to some embodiments of the subject technology.

Referring now to FIGS. 6 and 7, the stylus 100 can be used to provide feedback during use in free space. For example, the stylus 100 can simulate tactile sensations that correspond to a user experience in a mixed reality system. A mixed reality system providing a visual display or other output to a user can also provide tactile feedback with the shear device 150 of the stylus 100. The feedback can be based on operation of the stylus 100 in an augmented reality system, an augmented virtuality system, and/or a virtual environment.

As shown in FIG. 6, the stylus 100 can be operated by a user 10 in a manner that moves the stylus 100 through space. Each point in space corresponds to a point within a virtual environment of a mixed reality system. A region 198 of space can correspond to a region of the virtual environment. For example, a virtual object can be rendered in the virtual environment and displayed or otherwise output for reference by the user. The display can include a headset, a head-up display, and/or an optical head-mounted display in communication with the stylus 100 (e.g., directly or via an intervening device). A surface, volume, interior, or other portion of the virtual object can correspond to the location of the region 198 in space. Accordingly, when the stylus 100 is moved to the region 198 in space, it is understood by the user to be positioned at the virtual object in the virtual environment.

While the stylus 100 is moved in free space, it does not readily experience the resistance to movement that would be encountered upon contact with a real object. For example, if the stylus 100 were moved in a first direction against a real object, a force in a second direction, opposite the first direction, would be transmitted to the stylus and felt by the user. Despite the lack of a real object, the stylus 100 can simulate contact based on the virtual object. For example, when the stylus 100 is moved to the region 198 in space, corresponding to a region of the virtual environment in which the virtual object is located, the shear device 150 can be operated to provide shear forces. In particular, where the stylus 100 is moved in a first direction toward, against, and/or through the region 198, the sliding elements 120 of the shear device 150 are moved in a second direction, opposite the first direction, relative to the bridge segments 112. The shear force experience by the user simulates the force (e.g., resistance) that would be encountered by contact with a real object.

The force can be managed according to movement of the stylus 100. Movement of the sliding elements 120 can be performed based on the location, speed, acceleration, and/or other features of the stylus 100. Movement of the sliding elements 120 can be based on the location, speed, acceleration, and/or other features of the stylus 100 with respect to the region 198 and/or the object in the virtual environment. For example, as the stylus 100 moves past the region 198, the sliding elements 120 can continue to move accordingly and increase the magnitude of the shear force applied to the user. By further example, as the stylus 100 reverses away from the region 198, the sliding elements 120 can reverse direction to an initial position and relieve the shear force applied to the user.

Figure 8:
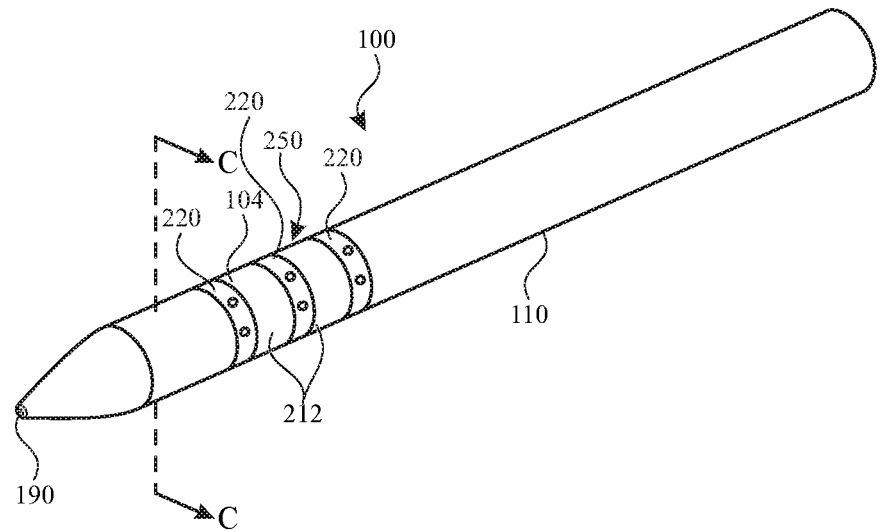
FIG. 8 illustrates a perspective view of a stylus, according to some embodiments of the subject technology.
Figure 9:
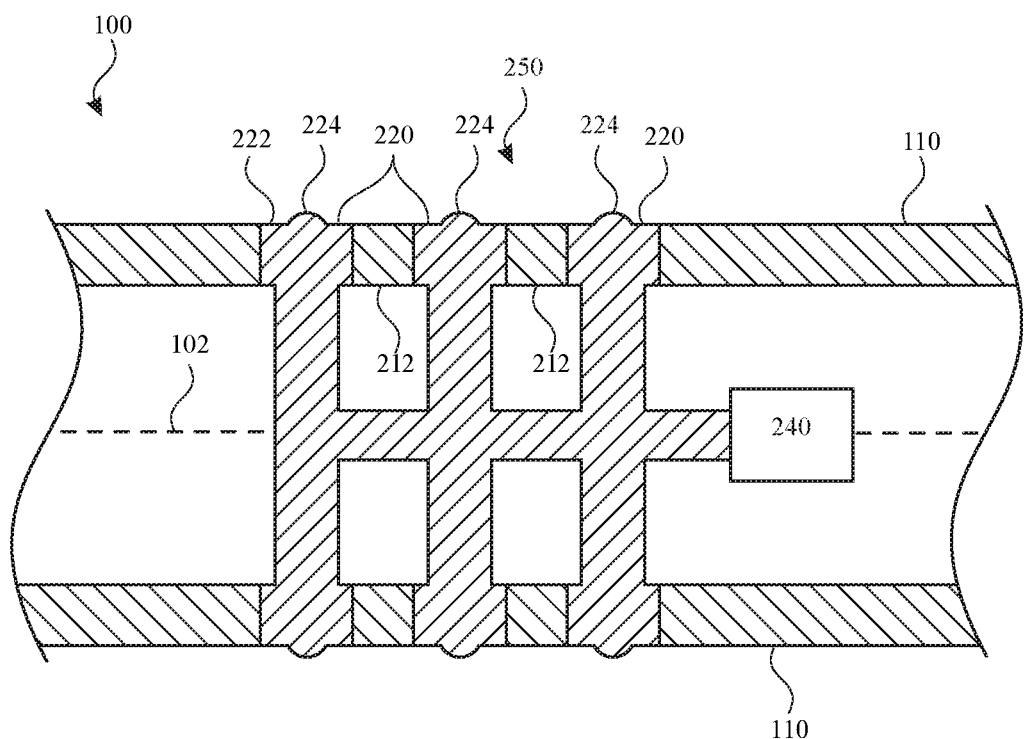
FIG. 9 illustrates a side sectional view of the section C-C of the stylus of FIG. 8, according to some embodiments of the subject technology.

Referring now to FIGS. 8 and 9, the stylus can include a shear device that provides shear forces that are rotational in nature. As shown in FIG. 8, the housing 110 can include multiple bridge segments 212 that are distributed along a longitudinal (e.g., axial) length of the stylus 100. Between axially adjacent pairs of bridge segments 212, one or more sliding elements 220 can be provided. The bridge segments 212 and the sliding elements 220 can, together, define an outer periphery of the user grip region 104 of the stylus 100. As such, the bridge segments 212 and the sliding elements 220 can both present outwardly facing surfaces that can be grasped by a user.

As shown in FIG. 9, the bridge segments 212 and the sliding elements 220 can be arranged in an alternating pattern along the length of the user grip region 104. Each bridge segment 212 can be surrounded on sides thereof by a pair of sliding elements 220. Each sliding element 220 can be surrounded on sides thereof by a pair of bridge segments 212 or another portion of the housing 110. Additionally or alternatively, multiple sliding elements 220 can be axially adjacent to each other. Axially adjacent sliding elements 220 can be configured to move in the same direction or different (e.g., opposite) directions, as discussed further herein.

The sliding elements 220 and the bridge segments 212 can define an outwardly facing external surface of the user grip region 104 of the stylus 100. As shown in FIG. 9, an outer periphery of the user grip region 104 is defined by both the bridge segments 212 and the sliding elements 220. The total area of the user grip region 104 can be divided between the bridge segments 212 and the sliding elements 220. For example, the sliding elements 220 can define 10%, 20%, 30%, 40%, 50%, 60%, 70%, 80%, or 90% of the total area of the user grip region 104. By further example, the bridge segments 212 can define 10%, 20%, 30%, 40%, 50%, 60%, 70%, 80%, or 90% of the total area of the user grip region 104. The contribution of each can be determined by the size, distribution, and number of sliding elements 220 and bridge segments 212. For example, the sliding elements 220 and bridge segments 212 can be present in the same or different numbers. The sliding elements 220 and bridge segments 212 can have the same or different sizes in one or more dimensions (e.g., length, width, arc length, etc.). While one example of a user grip region 104 is shown in FIG. 9, it will be appreciated that variations can be provided. For example, any number of bridge segments 212 and sliding elements 220 can be provided. For example, the user grip region 104 can include 1, 2, 3, 4, 5, 6, 7, 8, 9, 10, 11, 12, or more than 12 bridge segments 212 and/or sliding elements 220.

Movement of the sliding elements 220 can be facilitated by an actuator 240, such as a motor. The actuator 240 can be connected to one, some, and/or all of the sliding elements 220. Accordingly, the actuator 240 can rotate the sliding elements 220 separately or in unison. Additional actuators 240 can be provided to independently move the sliding elements 220. Additionally or alternatively, the sliding elements 220 can be connected to any given actuator 240 in a manner that allows the sliding elements 220 to move differently from each other. Accordingly, the sliding elements 220 can be moved in a direction together relative to bridge segments 212 so that outer surfaces of the sliding elements 220 slide laterally past outer surfaces of the bridge segments 212. Additionally or alternatively, the sliding elements 220 can be moved in different directions relative to each other so that outer surfaces of the sliding elements 220 slide laterally past each other.

One or more of the sliding elements 220 can include a base portion 222 and a protruding portion 224. The base portion 222 can be flush with a longitudinally (e.g., axially) adjacent portion of a bridge segment 212 or another portion of the housing 110. When contacted by a user, the user may not tactilely sense a difference between the base portion 222 and the adjacent bridge segment 212 while the sliding element 220 is at rest. The protruding portions 224 of the sliding elements 220 can be proud of the base portion 222, an adjacent bridge segment 212, and/or another portion of the housing 110. The protruding portions 224 provide features for engaging the user and providing tactile feedback upon rotation of the sliding elements 220. The protruding portions 224 can be provided in any number or arrangement. For example, the protruding portions 224 can be distributed circumferentially along the sliding elements 220, for example in a row. Multiple protruding portions 224 can be distributed in different rows along the corresponding sliding element 220. The protruding portions 224 can be evenly or unevenly distributed. Different sliding elements 220 can have the same or different pattern of protruding portions 224. The protruding portions 224 can have the same or different sizes (e.g., width, height) and/or shapes. Additionally or alternatively, it will be understood that protruding portions can be provided on the bridge segments 212 of the stylus 100.

Engagement features of the user grip region 104 provide an increased coefficient of friction (e.g., relative to a flat or smooth surface). For example, the sliding elements 220 and/or the bridge segments 212 can engage the user's fingers while moving so that shear forces are transmitted to the user rather than sliding under and past the user's fingers.

In user, the user grasps the user grip region 104 of the stylus 100. Portions of a given finger will contact at least one bridge segment 212 and at least one sliding element 220, based on the size, distribution, and number of bridge segments 212 and sliding elements 220. As the bridge segments 212 and/or sliding elements 220 rotate in different directions relative to each other, shear forces are transmitted to the user. Specifically, different portions of the user grip region 104 (e.g., bridge segments 212 and sliding elements 220) engage different portions of a given finger and apply forces in different (e.g., opposite) directions. The sensation experienced by the user is that of shear forces applied to the finger(s).

As shown in FIG. 9, the bridge segments 212 in the sliding elements 220 can be evenly distributed along a length of the user grip region 104. For example, the user grip region 104 can present radial and/or bilateral symmetry.

Figure 10:
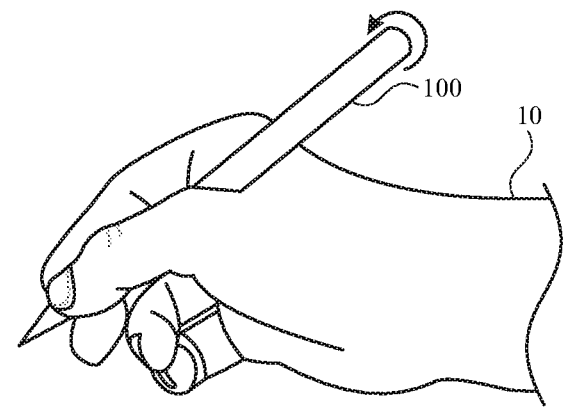
FIG. 10 illustrates a perspective view of a stylus for providing shear force feedback to a user during use, according to some embodiments of the subject technology.
Figure 10:
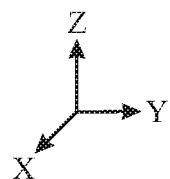
Figure 11:
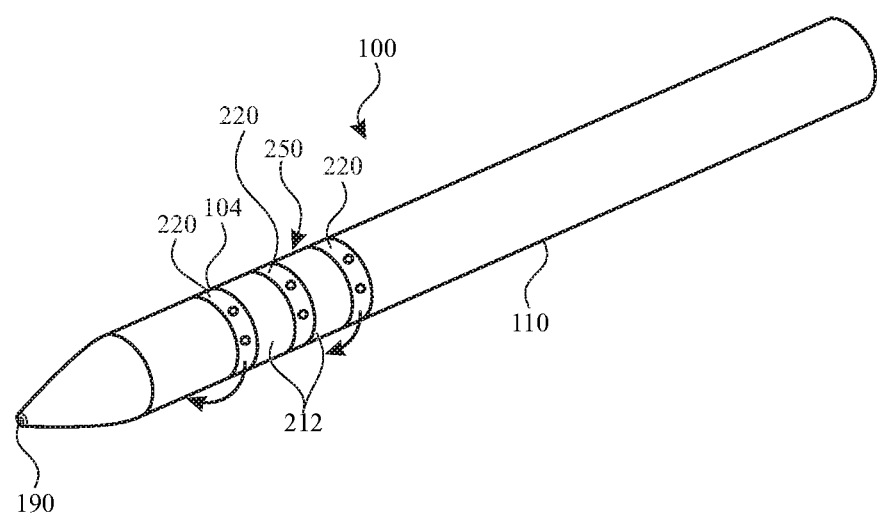
FIG. 11 illustrates a perspective view of the stylus of FIG. 10, according to some embodiments of the subject technology.

Referring now to FIGS. 10 and 11, the stylus 100 can be used to provide feedback during use in free space. As shown in FIG. 10, the stylus 100 can be operated by a user 10 in a manner that rotates the stylus 100 through space. While the stylus 100 is rotated in free space, it does not readily experience the resistance to movement that would be encountered upon rotation to apply torque to a real object. For example, if the stylus 100 were rotated in a first direction to apply torque to a real object, a torque in a second direction, opposite the first direction, would be transmitted to the stylus and felt by the user. Despite the lack of a real object, the stylus 100 can simulate such torque. For example, when the stylus 100 is rotated, the shear device 250 can be operated to provide shear forces. In particular, where the stylus 100 is rotated in a first direction (e.g., about its axis), the sliding elements 220 of the shear device 250 are moved in a second direction, opposite the first direction, relative to the bridge segments 212. The shear force experience by the user simulates the force (e.g., resistance) that would be encountered by applying torque to a real object.

The shear force can be managed according to rotation of the stylus 100. Rotation of the sliding elements 220 can be performed based on the angular position, speed, acceleration, and/or other features of the stylus 100. For example, as the stylus 100 rotates past a given orientation (e.g., with respect to a virtual object), the sliding elements 220 can continue to move accordingly and increase the magnitude of the shear force applied to the user. By further example, as the stylus 100 reverses rotational direction, the sliding elements 220 can reverse direction to an initial position and relieve the shear force applied to the user.

The shear devices described herein can provide shear forces for one or more other purposes. According to some embodiments, the shear forces can notify the user based on a message, alert, or alarm. Such notifications can be accompanied by other feedback, including tactile, auditory, and/or visual feedback on the stylus 100 and/or the external device. According to some embodiments, the shear forces can provide confirmation that a user selection (e.g., made with the stylus 100) has been received by the external device 90. According to some embodiments, the shear forces can inform the user regarding status or operation of the external device 90.

The shear devices can provide shear forces to a user based on usage with the external device 90. For example, the tip 190 of the stylus 100 can be used to contact the surface 50 of the external device 90. When the tip 190 of the stylus 100 is at particular positions and/or orientations with respect to the surface 50, the shear devices can provide shear forces to indicate to the user information corresponding to the positions and/or orientations.

Operation of the shear devices of the stylus 100 can be performed in combination with the haptic device 178 of the stylus 100. For example, shear forces and haptic feedback can be provided by the stylus 100 simultaneously and/or in sequence. Additionally or alternatively, operation of the shear devices of the stylus 100 can be performed in combination with a haptic feedback system of the external device 90. For example, shear forces can be provided by the stylus 100 and haptic feedback provided by the external device 90 simultaneously and/or in sequence.

As discussed herein, improved styluses can produce shear forces that act on a user to provide unique tactile sensations. For example, a shear device can be included at a grip region of a stylus to provide shear sensations at the user's hand (e.g., fingers). The shear forces can be unaligned forces that urge one part of the user's hand in one direction and another part of the user's hand in an opposite direction or that tend to maintain the other part of the user's hand in a stationary location. The sensation can be targeted directly to the user's hand, rather than generally across the entire stylus. Shear forces can be used with a virtual reality, augmented reality, or mixed reality system to simulate tactile sensations of interacting with physical objects even when no such objects are present.

While some embodiments of input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the external device can be any device that interacts with a touch-based input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A stylus comprising:
   a housing comprising bridge segments that are circumferentially spaced apart from each other to define openings extending through the housing;
   sliding elements positioned within the openings, the bridge segments and the sliding elements defining a portion of an outermost surface of the stylus, wherein the bridge segments, the openings, and the sliding elements extend parallel to a longitudinal axis of the stylus; and
   an actuator configured to controllably move the sliding elements within the openings and relative to the bridge segments.

2. The stylus of claim 1, further comprising:
   a tip moveable relative to the housing;
   a force sensor for detecting when a force is applied to the tip; and
   a communication component configured to transmit to an external device an output based on the force applied to tip and configured to receive from the external device a command for controlling movement of the sliding elements with the actuator.

3. The stylus of claim 1, further comprising an accelerometer for measuring motion of the stylus, wherein, based on measurements of the accelerometer, the sliding elements are moved by the actuator and relative to the bridge segments when the stylus is moved through a region in space corresponding to a region of a virtual environment.

4. The stylus of claim 1, wherein each of the sliding elements comprises:
   a base portion that is flush with each of an adjacent pair of the bridge segments; and
   protruding portions that are proud of the base portion.

5. The stylus of claim 1, wherein the actuator is configured to move the sliding elements in a direction parallel to a longitudinal axis of the stylus.

6. The stylus of claim 1, wherein the actuator is a first actuator configured to move a first one of the sliding elements, the stylus further comprising a second actuator configured to move a second one of the sliding elements independently of the first one of the sliding elements.

7. A stylus comprising:
   a housing comprising an opening at a grip region of the stylus; and
   a sliding element moveable within the opening and defining a portion of the grip region;
   an actuator configured to controllably move the sliding element within the opening;
   a power source; and
   a controller operably connected to the actuator and the power source to control an operation of the actuator, wherein, when the stylus is moved in a first direction, the controller uses power from the power source to operate the actuator such that the sliding element moves in a second direction that is opposite the first direction to transmit a shear force as an output to a user grasping the housing and the sliding element.

8. The stylus of claim 7, wherein movement of the stylus in the first direction is with respect to a region in space that corresponds to a region of a virtual environment that is displayed to the user.

9. The stylus of claim 7, further comprising an accelerometer for measuring acceleration of the stylus, wherein the first direction and the second direction are directions of translational movements of the stylus.

10. The stylus of claim 9, wherein movement of the stylus in the first direction corresponds to movement of the stylus with respect to an object in a virtual environment that is displayed to the user, and movement of the sliding element in the second direction simulates resistance to movement of the stylus through the object.

11. The stylus of claim 7, further comprising a gyroscope for measuring an orientation of the stylus, wherein the first direction and the second direction are directions of rotations about an axis of the stylus.

12. The stylus of claim 11, wherein rotation of the stylus in the first direction corresponds to rotation of the stylus with respect to an object in a virtual environment that is displayed to the user, and rotation of the sliding element in the second direction simulates resistance to rotation of the stylus with respect to the object.

13. The stylus of claim 7, wherein the actuator is configured to move the sliding element in a direction parallel to a longitudinal axis of the stylus.

14. The stylus of claim 7, wherein the actuator is configured to rotate the sliding element about a longitudinal axis of the stylus.

15. A stylus comprising:
   a housing comprising bridge segments extending about a longitudinal axis of the stylus and longitudinally spaced apart from each other to define openings extending through the housing;
   sliding elements positioned within the openings, the bridge segments and the sliding elements defining a portion of an outermost surface of the stylus, wherein the bridge segments, the openings, and the sliding elements extend circumferentially about a longitudinal axis of the stylus; and
   an actuator configured to rotate the sliding elements about the longitudinal axis and relative to the bridge segments.

16. The stylus of claim 15, further comprising a gyroscope for measuring an orientation of the stylus, wherein, based on measurements of the gyroscope, the actuator is configured to rotate the sliding elements when the stylus is rotated about the longitudinal axis.

17. The stylus of claim 15, further comprising:
   a tip moveable relative to the housing;
   a force sensor for detecting when a force is applied to the tip; and
   a communication component configured to transmit to an external device an output based on the force applied to tip and configured to receive from the external device a command for controlling rotation of the sliding elements with the actuator.

18. The stylus of claim 15, wherein each of the sliding elements comprises:
- a base portion that is flush with each of an adjacent pair of the bridge segments; and
- protruding portions that are proud of the base portion.

19. The stylus of claim 15, wherein the actuator is a first actuator configured to move a first one of the sliding elements, the stylus further comprising a second actuator configured to move a second one of the sliding elements independently of the first one of the sliding elements.

* * * * *